Sept. 28, 1965
J. C. NASH
3,208,100
LONGITUDINAL WEB STRETCHING MACHINE
Filed Oct. 15, 1962
5 Sheets-Sheet 1
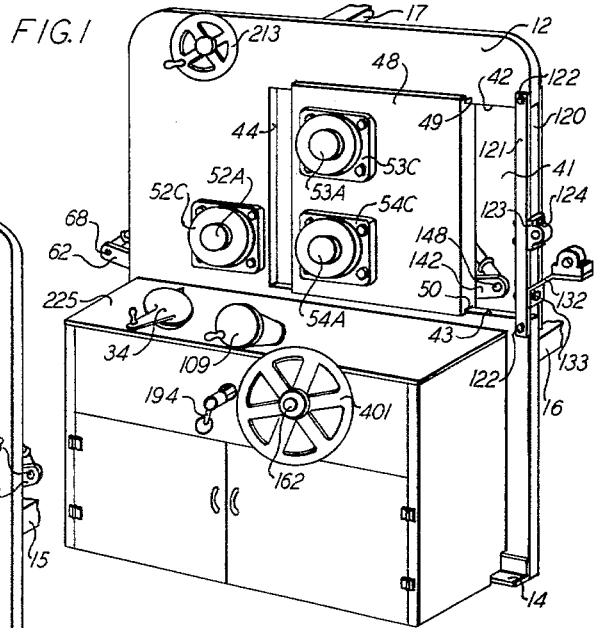
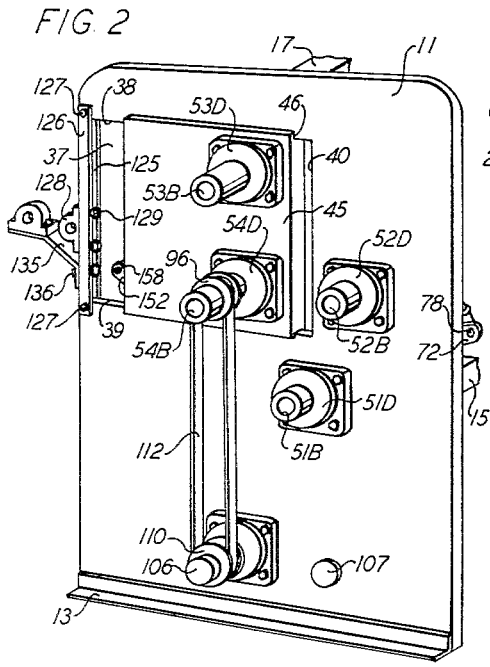
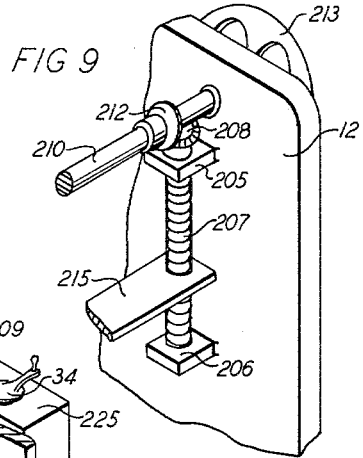
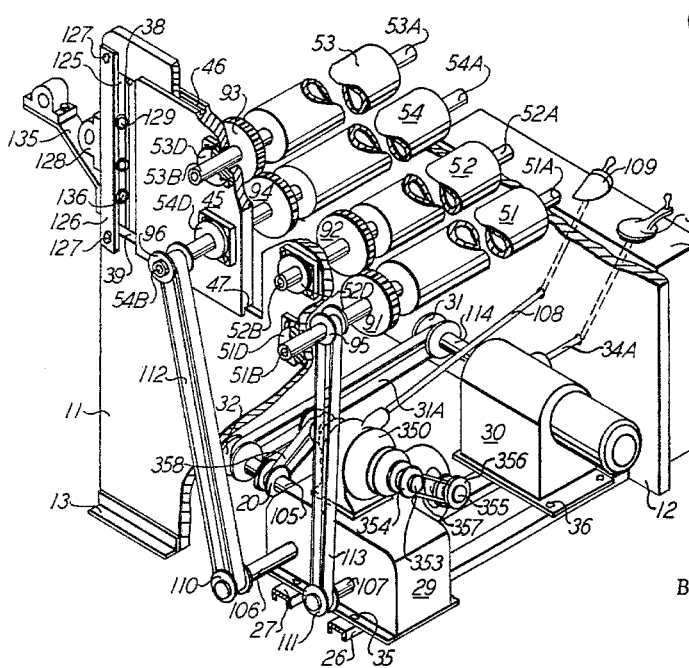
INVENTOR.
JOHN CRANDON NASH
BY William Frederich Werner
ATTORNEY INVENTOR.
JOHN CRANDON NASH
BY
William Frederich Werner
ATTORNEY Sept. 28, 1965  J. C. NASH  3,208,100
LONGITUDINAL WEB STRETCHING MACHINE
Filed Oct. 15, 1962  5 Sheets-Sheet 5
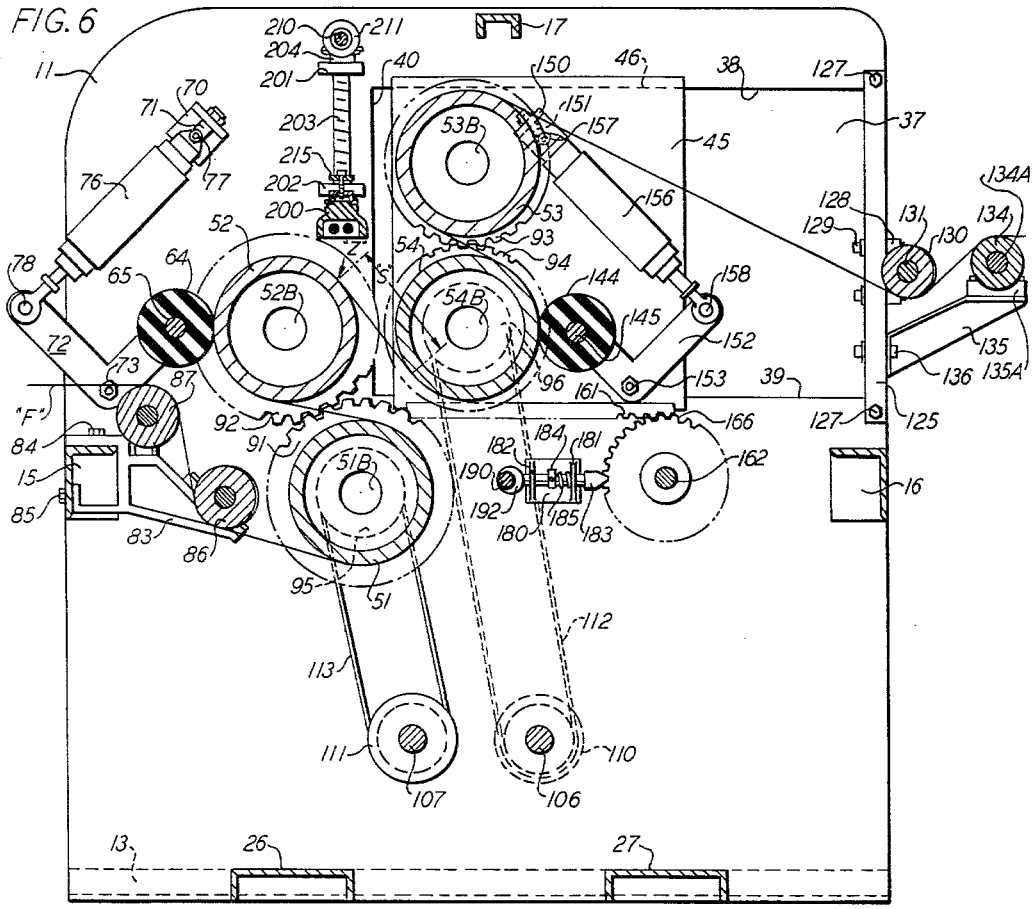
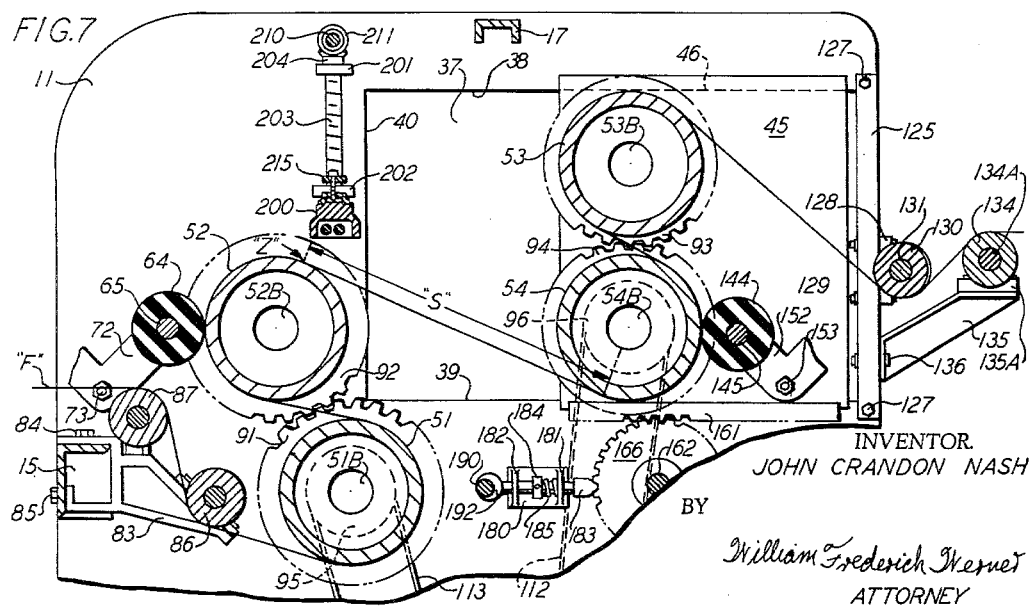
INVENTOR.
JOHN CRANDON NASH
BY
William Frederick Werner
ATTORNEY

United States Patent Office 3,208,100
Patented Sept. 28, 1965

3,208,100
LONGITUDINAL WEB STRETCHING MACHINE
John Crandon Nash, Providence, R.I., assignor, by mesne assignments, to Bevis Industries, Inc., Providence, R.I., a corporation of Florida
Filed Oct. 15, 1962, Ser. No. 230,491
6 Claims. (Cl. 18—1)

This invention relates to apparatus for stretching webs and films and more particularly it relates to a machine for longitudinally stretching plastic film in a plastic state to increase the film length and reduce the film thickness.

An object of the present invention is to provide a machine with apparatus for heating a continuous web of plastic film and to provide draw rolls for longitudinally stretching the continuous web as it passes through the machine.

Another object of the present invention is to provide a machine, for longitudinally stretching a running web of plastic film, with two sets of draw rolls which can be rotated at varying relative speeds, and at varying selected relative distances, and at varying relative surface temperatures on each set of draw rolls.

Other objects of the present invention will become apparent in part and be pointed out in part in the following specification and claims.

With the advent of increased use of plastic film for a variety of articles there has developed a need to longitudinally stretch a web of plastic film to provide a web of desired width and thickness. Efforts have been made to initially manufacture a web of desired width and thickness. Such efforts have not been commercially successful. It has been found that the successful stretching of a plastic web requires four physical conditions.

(1) The heating of the plastic web or film to a proper degree to plastercise the film.
(2) A stretch ratio of the film must be provided.
(3) A stretch rate must be provided.
(4) The plastercised film must be "set" after stretching.

These four conditions are provided for in the present longitudinal web stretching machine. (1) The film to be stretched is heated to a proper degree by a first set of draw rolls (51, 52). A heating lamp (200) is provided to add additional heat when necessary. (2) The stretch ratio of the plastic film is provided by the difference in linear speeds between the two sets of draw rolls. (3) The stretch rate of the plastic film is determined by the linear distance between the two points of tangency on adjacent draw rolls of the two separate sets of draw rolls. This linear distance is variable through the adjustment feature of moving one set of draw rolls toward and away from the other set of draw rolls. (4) The plastercised stretched film is "set" by the surface temperature of the second set of draw rolls. In addition, the adjustable feature facilitates the initial threading of the web around both sets of draw rolls.

Referring to the drawings in which similar characters of reference indicate corresponding parts:

FIGURE 1 is a perspective view of the control panel located on the right side wall of the machine.

FIGURE 2 is a perspective view of the left side wall of the machine showing the fluid ends of the draw roll shafts.

FIGURE 6 is a vertical cross sectional view taken along line 6—6 of FIGURE 3, looking toward the left side of the machine.

FIGURE 7 is a fragmentary view, similar to FIGURE 6, showing the panel and one set of rolls in adjusted web stretching position.

FIGURE 8 is a fragmentary schematic perspective view of the mechanism for driving the two sets of stretching rolls.

FIGURE 9 is a fragmentary perspective view of the mechanism for adjusting a film heating lamp.

Figure 3:
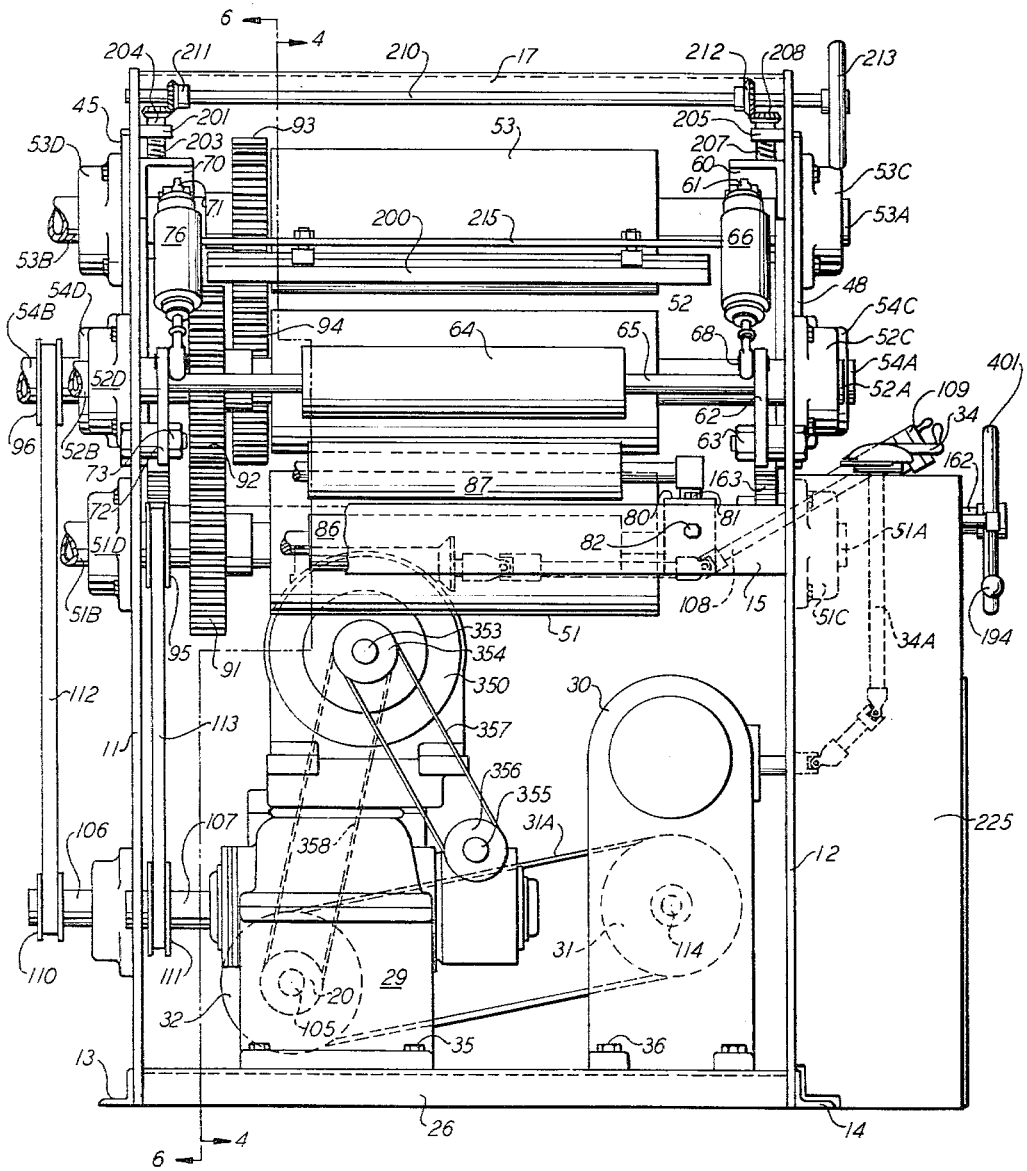
FIGURE 3 is a front elevational view of the new and improved longitudinal web stretching machine.
Figure 4:
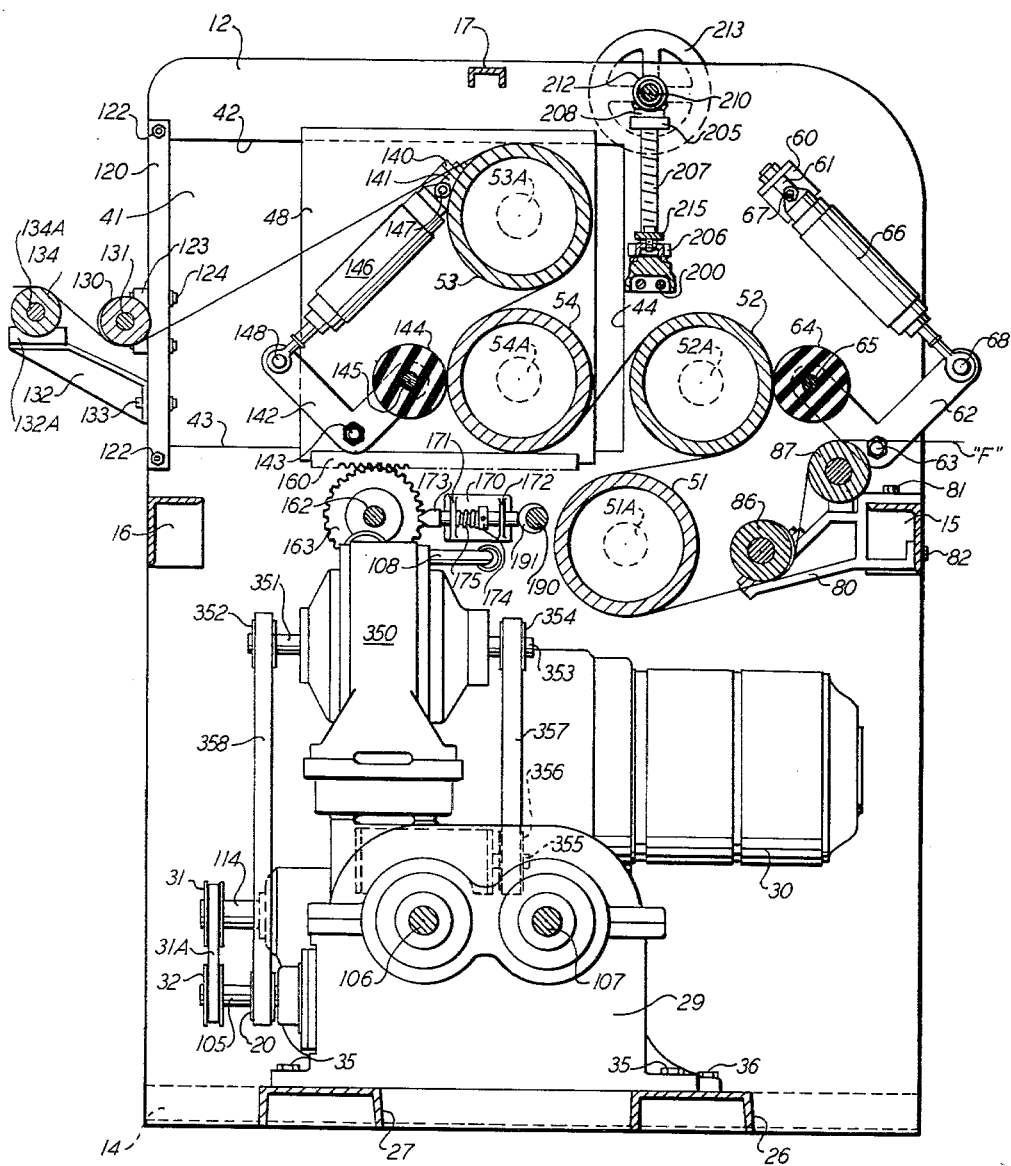
FIGURE 4 is a vertical cross sectional view taken along line 4—4 of FIGURE 3, looking toward the right side of the machine.
Figure 5:
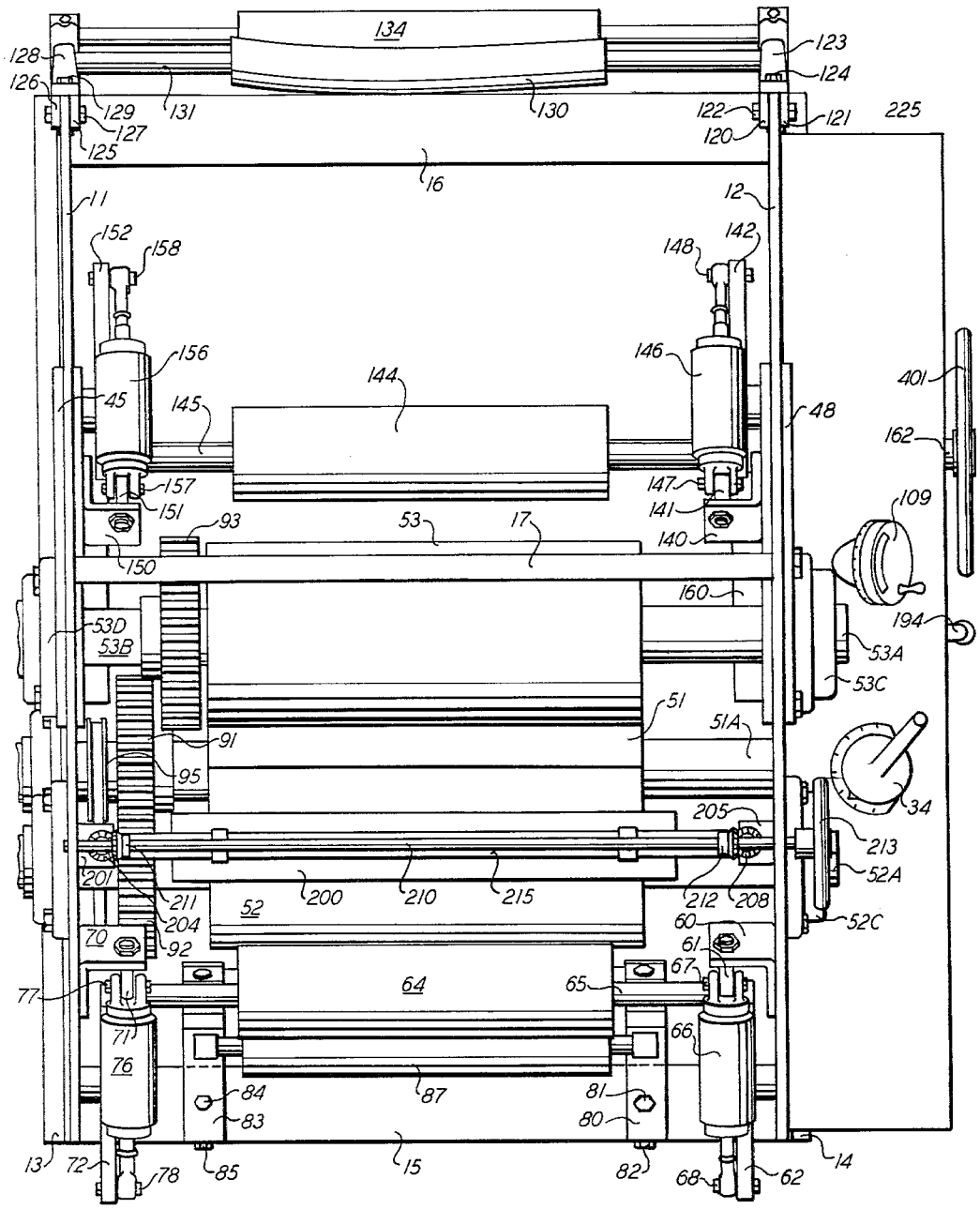
FIGURE 5 is a plan view of the new and improved longitudinal web stretching machine.

According to the invention the new and improved longitudinal web stretching machine consists of a frame having a left side vertical wall 11 and an opposite right side vertical wall 12. An angle iron foot 13 is welded to the bottom of left side vertical wall 11. An angle iron foot 14 is welded to the bottom of right side vertical wall 12. Spacing brackets 15, 16 are welded on opposite ends, respectively, to left side vertical wall 11 and right side vertical wall 12. A top bracket 17 is welded on opposite ends, respectively, to left side vertical wall 11 and right side vertical wall 12.

Two angle iron base brackets 26, 27 are welded on opposite ends to left side vertical wall 11 and right side vertical wall 12, respectively.

Thus, the longitudinal web stretching machine comprises a frame consisting of opposed walls and interconnecting longitudinal members fastened to said opposed walls.

Left side vertical wall 11 is provided with an opening 37 which forms upper track 38, lower track 39, and rear abutment 40. Similarly, right side vertical wall 12 is provided with an equal and parallel opening 41 which forms upper track 42, lower track 43, and rear abutment 44.

A left side sliding panel 45 having an upper groove 46 and a lower groove 47 is slidingly mounted upon upper track 38 and lower track 39, respectively. A right side sliding panel 48 having an upper groove 49 and a lower groove 50 is slidingly mounted upon upper track 42 and lower track 43, respectively.

The sliding panels 45, 48 provide the frame with adjustable supporting means for a set of draw rolls, as will presently appear.

Two sets of draw rolls are provided for stretching the web. The stretching operation takes place between adjacent rolls of the opposite sets of draw rolls.

The sets of draw rolls may constitute one roll in each set because the stretch ratio and stretch rate is determined by the relationship between these two rolls. However, for purposes of supplying sufficient heat to the web and to prevent slippage of the web on the draw rolls, two, three or more rolls may constitute a set of draw rolls. For purposes of illustration two rolls are shown as constituting a set of draw rolls.

Two draw rolls 51, 52 constitute a pair or a set. Draw roll 51 is provided with a stub shaft 51A and a hollow shaft 51B. Draw roll 52 is provided with a stub shaft 52A and a hollow shaft 52B. Stub shafts 51A, 52A are rotatively mounted, respectively, in bearings 51C and 52C fixed in right side vertical wall 12. Hollow shafts 51B, 52B are rotatively mounted, respectively, in bearings 51D and 52D fixed in left side vertical wall 11. Thus, draw rolls 51 and 52, the so called fixed set, are rotatively mounted in the frame.

Similarly, draw rolls 53, 54 constitute another pair or a second set of draw rolls. Draw roll 53 is provided with a stub shaft 53A and a hollow shaft 53B. Draw roll 54 is provided with a stub shaft 54A and a hollow shaft 54B. Stub shafts 53A, 54A are rotatively mounted, respectively, in bearings 53C, 54C fixed in right side sliding panel 48. Hollow shafts 53B, 54B are rotatively mounted, respectively, in bearings 53D, 54D fixed in left side sliding panel 45. Thus, draw rolls 53, 54 the so called adjustable set, are rotatively mounted in the sliding panels 45, 48 or the adjustable means provided in the frame for moving one set of draw rolls toward or away from the other set of draw rolls to vary the "stretch" distance and provide the stretch rate between the draw roll 52 of one set and the draw roll 54 of the other set.

The hollow shafts 51B, 52B, 53B, 54B, extend beyond bearings 51D, 52D, 53D, 54D, respectively, and left side vertical wall 11, so as to provide a means, whereby rotary joints (not shown) may be attached for purposes which will presently appear.

The draw rolls 51, 52, 53, 54 are calender rolls for the circulation of fluid which controls the temperature at the surface of the respective roll. One such calender roll is shown and described in United States Patent No. 2,498,662 or in U.S. Patent No. 1,651,502 or preferably in U.S. patent application Serial No. 127,314 filed July 27, 1961, by John Crandon Nash which issued as Patent No. 3,120,867, dated February 11, 1964.

These calender rolls 51, 52, 53 and 54 comprise compartmented hollow cylinders in which the stub shafts 51A, 52A, 53A, 54A, fluid seal the respective hollow cylinders on one end. The hollow shafts 51B, 52B, 53B, 54B, provide fluid communication with the respective hollow cylinders.

Hollow shafts 51B, 52B, 53B, 54B, are provided respectively, with gears 91, 92, 93, 94. Gears 91, 92 of the fixed set of draw rolls 51, 52 mesh or engage. Gears 93, 94 of the adjustable set of draw rolls 53, 54 engage. Hollow shafts 51B and 54B are respectively, provided with pulleys 95, 96.

An electric motor 30 is provided with a shaft 114 having a pulley 31 which is operatively connected by means of a belt 31A to a pulley 32 of a variable speed mechanism 29. Motor 30 is a variable speed motor of any conventional type or a conventional electric motor with a variable speed drive under control of a lever 34A having a rotating handle 34 or other well known controlling means which varies the speed of rotation of pulley 31.

Variable speed mechanism 29 may be a positively driven variable speed mechanism such as that disclosed in United States patent application, Serial No. 197,016 filed May 23, 1962 by John Crandon Nash, or it may be any other variable speed transmission.

As illustrated variable speed mechanism 29 is provided with a speed control device or variator 350, which is disclosed in United States Patent No. 2,469,653 dated May 10, 1949.

Variator 350 is provided with shaft 351 having a pulley 352 and a shaft 353 having a pulley 354 and a control rod 108 having a handle 109. Variable speed mechanism 29 is provided with a shaft 355 having a pulley 356. A belt 357 operatively connects pulleys 354 and 356. A belt 358 operatively connects pulleys 20 and 352. Variable speed mechanism 29 is also provided with a shaft 105 and two output shafts 106 and 107. A pulley 20 and pulley 32 are fastened to shaft 105. Pulleys 110 and 111 are respectively fastened to output shafts 106 and 107. A belt 112 connects pulley 96 with pulley 110. A belt 113 connects pulley 95 with pulley 111.

It will be observed that handle 34 will control the variation in the speed of pulley 31 attached to shaft 114 of motor 30. Pulley 31 will control the speed of pulley 32, shaft 105, pulley 20, pulley 352 and shaft 351. Shaft 105 is positively connected to shaft 106 through the gear train (not shown) in variable speed mechanism 29. In turn shaft 106 through pulley 110, belt 112, pulley 96, hollow shaft 54B and gears 94, 93, rotates the stretch setting rolls 53, 54 at a preselected speed under control of handle 34.

Shaft 351 of variator 350 is rotating at the preselected speed of shaft 105. Handle 109 rotating control rod 108 will change the relative position of the mechanism planetary disks for example of variator 350 so that shaft 353 will rotate at a speed relative to the speed of shaft 351. In this manner heating rolls 51, 52 are driven at preferably a slower speed than draw rolls 53, 54 through gears 92, 91, hollow shaft 51B, pulley 95, belt 113, pulley 111, shaft 107 and the gear train (not shown) in variable speed mechanism 29, connected to both shafts 107, and 355, pulley 356, belt 357 and pulley 354 attached to shaft 353.

In this manner handles 34 and 109 control the relative speed of rotation between the two sets of draw rolls 51, 52 and 53, 54, respectively, and more particularly between draw rolls 54, 52. The difference in speed between draw rolls 52 and 54 varies the pull or tension on the web stretched between them, thus providing the stretch ratio on the web. This pull or tension is also varied by the variation in stretch distance, dimension "S" between the points of tangency of the web on draw rolls 52 and 54 under control of panels 45, 48 adjustably positioned in the frame (see FIGURES 6 and 7). Distance or dimension "S" provides the stretch rate on the web.

Variable speed mechanism 29 is fastened to base brackets 26, 27 by means of bolts 35. Motor 30 is fastened to base brackets 26, 27 by means of bolts 36.

Means (not shown) is provided to heat fluid which is circulated through draw rolls 51, 52 through rotary joints (not shown) attached to hollow shafts 51B, 52B, respectively. In this manner heat is transferred from the surface of draw rolls 51, 52 to the web or plastic film to heat or plastercise the film. Similarly, a coolant is circulated through draw rolls 53, 54 through rotary joints (not shown) attached to hollow shafts 53B, 54B, respectively. In this manner the web is cooled and/or the stretched plastercised film is set. Obviously, if the plastic film requires a "heat set" hot fluid may be circulated through draw rolls 53, 54.

Slippage between draw roll sets becomes a problem when great tension is placed upon the web in stretching the web. To overcome the problem of slippage applicant provides pinch or nip rolls which yieldingly force the web against the draw rolls. The nip roll construction will now be described.

A bracket 60 is provided with an arm 61 fastened to the inside surface of right side vertical wall 12 as by means of welding. A bell crank lever 62 is pivotally mounted to right side vertical wall 12 by means of a stud and bolt combination 63. A pinch or nip roll 64 is rotatively mounted on one end to bell crank lever 62 by means of a shaft 65. A hydraulic cylinder 66 is pivotally connected on one end to arm 61 by means of a nut and bolt combination 67 and is pivotally connected on the other end to bell crank lever 62 by means of a pintle 68.

Similarly, a bracket 70 is provided with an arm 71 fastened to the inside surface of left side vertical wall 11 as by means of welding. A bell crank lever 72 is pivotally mounted to left side vertical wall 11 by means of a stud and bolt combination 73. The pinch or nip roll 64 is rotatively mounted on the other end to bell crank lever 72 by means of shaft 65. A hydraulic cylinder 76 is pivotally connected on one end to arm 71 by means of a nut and bolt combination 77 and is piovtally connected on the other end to bell crank lever 72 by means of a pintle 78.

An arm 80 is fastened to spacing bracket 15 by means of nuts 81, 82, adjacent right side vertical wall 12. Similarly, an arm 83 is fastened to spacing bracket 15 by means of nuts 84, 85 adjacent left side vertical wall 11. Idler rolls 86, 87 are rotatively mounted on opposite ends, respectively, in arms 80, 83.

Two flat strips 120, 121 are fastened to right side vertical wall 12, by means of screws 122, at opening 41. A pillow block 123 is fastened to flat strips 120, 121 by means of nut and bolt combinations 124. Similarly, two flat strips 125, 126 are fastened to left side vertical wall 11, by means of screws 127, at opening 37. A pillow block 128 is fastened to flat strips 125, 126 by means of nut and bolt combinations 129. An idler roll 130 provided with a shaft 131 is rotatively mounted with the opposite ends of shaft 131 in pillow blocks 123, 128, respectively.

A bracket 132 provided with a pillow block 132A is fastened to flat strips 120, 121 by means of nut and bolt combinations 133. An idler roller 134 provided with a shaft 134A is rotatively mounted on one end with shaft 134A in pillow block 132A. Similarly, a bracket 135 provided with a pillow block 135A is fastened to flat strips 125, 126 by means of nut and bolt combinations 136. The other end of shaft 134A is rotatively mounted in pillow block 135A.

A bracket 140 provided with an arm 141 is fastened to sliding panel 48 as by means of welding. A bell crank lever 142 is pivotally mounted to sliding panel 48 by means of a stud and bolt combination 143. A pinch or nip roller 144 is rotatively mounted on one end to bell crank lever 142 by means of a shaft 145. A hydraulic cylinder 146 is pivotally connected on one end to arm 141 by means of a nut and bolt combination 147 and is pivotally connected on the other end to bell crank lever 142 by means of a pintle 148.

Similarly, a bracket 150 provided with an arm 151 is fastened to sliding panel 45 as by means of welding. A bell crank lever 152 is pivotally mounted to sliding panel 45 by means of a nut and bolt combination 153. The pinch or nip roll 144 is rotatively mounted on its other end to bell crank lever 152 by means of shaft 145. A hydraulic cylinder 156 is pivotally connected on one end to arm 151 by means of a nut and bolt combination 157 and is pivotally connected on the other end to bell crank lever 152 by means of a pintle 158.

Sliding panel 48 is provided on its lower edge with a rack 160. Sliding panel 45 is provided on its lower edge with a rack 161. A shaft 162 is rotatively mounted on opposite ends in right side vertical wall 12 and left side vertical wall 11, respectively. Pinions 163 and 166 are fixed to shaft 162 so as to operatively engage racks 160 and 161, respectively. A hand wheel 401 is fixed to the end of shaft 162, whereby rotation of hand wheel 401 slides panels 45 and 48 upon their respective tracks.

A bracket 170 provided with two flanges 171, 172 is fastened to right side vertical wall 12 by means of welding. A shaft 173 provided with a collar 174 is slidably mounted in flanges 171, 172 with a spring 175 interposed between flange 171 and collar 174.

A bracket 180 provided with two flanges 181, 182 is fastened to left side vertical wall 11 by means of welding. A shaft 183 provided with a collar 184 is slidably mounted in flanges 181, 182 with a spring 185 interposed between flange 181 and collar 184.

A rod 190 is rotatively mounted in left and right side vertical walls 11 and 12 with cams 191, 192 fixed to rod 190 and adapted to engage, respectively, shafts 173 and 183. A handle 194 is attached to one end of rod 90. Shaft 173 engages pinion 163 by means of a spring or detent action. Shaft 183 engages pinion 166 by means of a spring or detent action. Rod 190 through cams 191, 192 locks shafts 173, 183, respectively, in engagement with pinions 163, 166 whereby sliding panels 48, 45 are locked in adjusted position through racks 160, 161, respectively. In this manner the second set of draw rolls are held in selected "stretch rate" position dimension "S" FIGURES 6 and 7. Handle 194 rotates cams 191, 192 out of shaft 173, 183 engagement position whereby racks 160, 161 are free to rotate pinions 163, 166 in a detent action when sliding panels 48, 45 are slid upon tracks 42, 43 and 38, 39 respectively, to place draw rolls 53, 54 in selected or adjusted position.

FIGURE 6 illustrates a web of plastic film "F" threaded over the various rolls as the web passes through the new and improved longitudinal web stretching machine. The various rolls serve two purposes. First, they take wrinkles out of the web and hold the web flat and taut. Secondly, they prevent slippage of the web, especially between draw rolls 52, 54 where the stretching operation is performed.

A successful procedure in stretching certain types of plastic film requires a momentary application of additional heat at the exact point or horizontal plane where the initial stretch tension is applied. That point or horizontal plane is indicated at "Z," the point or horizontal line of tangency on draw roll 52 where the film or web leaves that draw roll 52 for the adjacent draw roll 54 of the other set of draw rolls. Draw roll 54 rotates at a greater speed than draw roll 52 and is positioned at a selected distance from draw roll 52. Draw roll 54 normally possesses a surface temperature different from the surface temperature of web heating draw roll 52, whereby the "set" is placed in the stretched web.

The additional heat may take many conventional forms. The form illustrated is a radiant heater 200 manufactured by The Edwin L. Wiegand Company, located in Pittsburgh, Pennsylvania, catalogue number RADD-3224, Chromalox Radiant Heater.

Left side vertical wall 11 is provided with two pads 201 and 202. A shaft provided with a screw thread 203 and a bevel gear 204 is rotatively mounted in pads 201, 202. Similarly, right side vertical wall 12 is provided with two pads 205, 206. A shaft provided with a screw thread 207 and a bevel gear 208 is rotatively mounted in pads 205, 206. A rod 210 provided with bevel gears 211 and 212 is rotatively mounted on opposite ends in left side vertical wall 11 and right side vertical wall 12 with bevel gear 211 engaging bevel gear 204 and bevel gear 212 engaging bevel gear 208. A wheel 213 is fastened to one end of rod 210. Radiant heater 200 is provided with a bracket 215 which engages and is raised and lowered by screw threads 203, 207. It will be noted that radiant heater 200 is located over horizontal plane "Z" and through rotation of wheel 213 moves vertically toward and away from web heating draw roll 52.

Hydraulic cylinders 66, 76, 146, 156 may be of any conventional type. As illustrated they are air operated cylinders manufactured by the Ortman-Miller Machine Company, Inc., located in Hammond, Indiana, Model "D," serial number 225107.

Motor 30 may be of any conventional type. As illustrated it is manufactured by U.S. Motor Inc., located in Milford, Connecticut, type VEUGH, frame 23-213-21 trademarked "Varidrive."

A control panel 225 is provided adjacent right side vertical wall 12 whereby the operation of the new and improved longitudinal web stretching machine may be controlled from a central position. Control panel 225 is adjacent wheel 213, handles 34, 109 and 194 and hand wheel 401.

Having shown and described a preferred embodiment of the present invention by way of example, it should be realized that structural changes could be made and other examples given without departing from either the spirit or scope of this invention.

What I claim is:

1. A longitudinal web stretching machine having a frame consisting of two opposed walls, two sliding panels, one for each wall, means slidingly mounting said two sliding panels in said two opposed walls, interconnecting longitudinal members fastened to said two opposed walls, a first draw roll, means rotatively mounting said first draw roll on opposite ends, respectively, in said two opposed walls, a second draw roll, means rotatively mounting said second draw roll on opposite ends, respectively, in said two sliding panels, for varying the distance between said first draw roll and said second draw roll, auxiliary heating means, mounting means fastening said auxiliary heating means in said frame and means for positively rotating said first draw roll at a different selective speed relative to said second roll.

2. A longitudinal web stretching machine having opposed frame walls and interconnecting longitudinal members between said walls, and in combination therewith, a first set of rolls consisting of a plurality of rolls, and a second set of rolls consisting of a plurality of rolls, the web to be stretched passing over said first set and said second set of rolls, support means for said first set of rolls carried by said frame, adjustable support means for said second set of rolls carried by said frame for varying the distance between said first set of rolls and said second set of rolls and means for positively rotating said first set of rolls and said second set of rolls at different relative speeds.

3. Longitudinal web stretching apparatus having opposed frame walls and interconnecting longitudinal members between said walls, two pairs of rolls over which the web to be stretched passes, the first pair of said rolls being heated and the second pair thereof being cooled, support means for one pair of rolls carried by said frame, adjustable support means carried by said frame for the other of said two pairs of rolls to vary the distance between the two pairs of rolls, and means for positively rotating each pair of rolls independently of the other, said means being further adjustable to drive at least one pair of said rolls at selectively variable speeds.

4. Longitudinal web stretching apparatus consisting of a frame having a pair of opposed vertical walls provided with interconnecting longitudinal members, a pair of opposed sliding panels, means slidingly mounting said pair of opposed sliding panels in said pair of opposed vertical walls, two sets of rolls, each set constituting a pair of rolls over which the web to be stretched passes, each of said pair of rolls having means for the circulation of transfer fluid to control the temperature at the surface of the roll, support means for one set of rolls carried by said opposed vertical walls, and support means for the other set of rolls carried by said pair of opposed sliding panels, said last mentioned set of rolls being adjustable toward and away from the first mentioned set of rolls to vary the stretch distance between the two sets of rolls, and means for positively rotating each set of rolls independently of the other set of rolls, said means being further adjustable to drive at least one set of rolls at selectively variable speeds in relation to the other set of rolls whereby stretching of the web takes place.

5. Longitudinal web stretching apparatus consisting of a frame having two opposed vertical walls provided with interconnecting longitudinal members, and with each wall having a sliding panel, two pairs of rolls over which the web to be stretched passes, one pair of rolls having means for the circulation of heat transfer fluid to control the temperature at the surface of the rolls, the other pair of rolls having means for the circulation of a cooling fluid to control the temperature at the surface of the rolls, support means for one pair of rolls carried by said two opposed vertical walls, and support means for the other pair of rolls carried by the sliding panel in each wall, said last mentioned pair of rolls being adjustable toward and away from the first mentioned pair of rolls, by the movement of the sliding panel in each wall to vary the stretch distance between the two pairs of rolls, and auxiliary heat means carried by said frame and located in substantial alignment with said pair of rolls having means for the circulation of heat transfer fluid, and means for positively rotating each pair of rolls independently of the other pair of rolls, said means being further adjustable to drive at least one pair of rolls at selectively variable speeds in relation to the other pair of rolls whereby stretching of the web takes place.

6. A longitudinal web stretching machine consisting of a frame having two opposed vertical walls provided with interconnecting longitudinal members and with each wall having a sliding panel, two pairs of rolls over which a web to be stretched passes, one pair of rolls having means for the circulation of heat transfer fluid to control the temperature at the surface of the rolls, the other pair of rolls having means for the circulation of a cooling fluid to control the temperature at the surface of the rolls, support means for one pair of rolls carried by said two opposed vertical walls, and support means for the other pair of rolls carried by the sliding panel in each wall, a pair of pinch rolls pivotally mounted on said two opposed vertical walls, pneumatic means operatively engaging said pair of pinch rolls with one of said pair of rolls, a second pair of pinch rolls pivotally mounted to the sliding panel of each wall, pneumatic means operatively engaging said second pair of pinch rolls with one of said other pair of rolls, a radiant heating element, adjustable means fastened to said two opposed vertical walls adjustably mounting said radiant heating element in selected position over one of said one pair of rolls, and locking means provided to lock the sliding panel in each wall in selected position, and means for rotating each of said two pairs of rolls independently of the other pair of rolls and at different relative speeds.

References Cited by the Examiner
UNITED STATES PATENTS

| | | | |
|---|---|---|---|
| 1,613,300 | 1/27 | Troland | 18—1 XR |
| 2,540,986 | 2/51 | Klein et al. | 18—1 |
| 2,545,868 | 3/51 | Bailey. | |
| 2,547,736 | 4/51 | Blake. | |
| 2,578,820 | 12/51 | Mayer | 26—54 XR |
| 2,804,652 | 9/57 | Balkan. | |
| 2,854,697 | 10/58 | Ryan. | |

WILLIAM J. STEPHENSON, *Primary Examiner.*